United States Patent [19]

Kulprathipanja et al.

[11] Patent Number: 4,608,060
[45] Date of Patent: Aug. 26, 1986

[54] SEPARATION OF POLAR GASES FROM NONPOLAR GASES

[75] Inventors: Santi Kulprathipanja; Sudhir S. Kulkarni, both of Hoffman Estates, Ill.

[73] Assignee: UOP Inc., Des Plaines, Ill.

[21] Appl. No.: 723,398

[22] Filed: Apr. 15, 1985

[51] Int. Cl.$^4$ ............................................. B01D 53/22
[52] U.S. Cl. .......................................... 55/16; 55/68; 55/73
[58] Field of Search ....................... 55/16, 68, 73, 158; 210/490, 500.2, 506; 427/316, 324, 412.2, 444; 428/36, 373, 391, 393–395, 405

[56] References Cited

U.S. PATENT DOCUMENTS

| | | | |
|---|---|---|---|
| 3,133,132 | 5/1964 | Loeb et al. | 264/49 |
| 3,133,137 | 5/1964 | Loeb et al. | 264/233 |
| 3,335,545 | 8/1967 | Robb et al. | 55/158 X |
| 3,457,180 | 7/1969 | Kretz et al. | 252/301.2 |
| 3,556,305 | 1/1971 | Shorr | 210/490 |
| 3,625,734 | 12/1971 | Ward, III | 55/16 X |
| 3,653,180 | 4/1972 | Juliano et al. | 55/16 |
| 3,656,993 | 4/1972 | Edwards et al. | 427/316 |
| 3,810,775 | 5/1974 | Uhl et al. | 427/324 X |
| 3,862,030 | 1/1975 | Goldberg | 210/24 |
| 3,878,104 | 4/1975 | Guerrero | 210/323 |
| 3,993,566 | 11/1976 | Goldberg et al. | 210/433 M |
| 4,032,454 | 6/1977 | Hoover et al. | 210/323 R |
| 4,098,931 | 7/1978 | Yoshida et al. | 427/324 |
| 4,170,559 | 10/1979 | Kroplinski et al. | 55/158 X |
| 4,230,463 | 10/1980 | Henis et al. | 55/16 |
| 4,243,701 | 1/1981 | Riley et al. | 427/244 |
| 4,302,334 | 11/1981 | Jakabhazy et al. | 210/500.2 |
| 4,341,605 | 7/1982 | Solenberger et al. | 204/98 |
| 4,388,256 | 6/1983 | Ishida et al. | 210/500.2 X |
| 4,430,807 | 2/1984 | Davis et al. | 55/16 X |
| 4,517,142 | 5/1985 | Baniel | 210/500.2 X |
| 4,549,012 | 10/1985 | Sharma | 210/500.2 X |

Primary Examiner—Robert Spitzer
Attorney, Agent, or Firm—Thomas K. McBride; John F. Spears, Jr.; Raymond H. Nelson

[57] ABSTRACT

Polar gases such as hydrogen sulfide, sulfur dioxide and ammonia may be separated from nonpolar gases such as methane, nitrogen, hydrogen or carbon dioxide by passing a mixture of polar and nonpolar gases over the face of a multicomponent membrane at separation conditions. The multicomponent membrane which is used to effect the separation will comprise a mixture of a glycol plasticizer having a molecular weight of from about 200 to about 600 and an organic polymer cast on a porous support. The use of such membranes as exemplified by polyethylene glycol and silicon rubber composited on polysulfone will permit greater selectivity accompanied by a high flux rate in the separation process.

10 Claims, No Drawings

SEPARATION OF POLAR GASES FROM NONPOLAR GASES

The Government of the United States of America has rights in this invention pursuant to Contract No. DE-AC07-82ID12422 awarded by the U.S. Department of Energy.

BACKGROUND OF THE INVENTION

The separation of fluids, either in gaseous or liquid form, has become increasingly important, especially in fields involving the purification of liquids. The process for the separation of liquids involves the utilization of a reverse osmosis system such as the purification of water and especially saline water or the removal of impurities from fluids such as blood in the field of dialysis. When utilizing reverse osmosis in the purification of water such as saline water, a pressure in excess of the osmotic pressure of the saline water feed solution is applied to the solution which is prepared from purified water by a semipermeable membrane. The purified water thereby diffuses through the membrane while the sodium chloride molecules or other impurities which may be present in the water are retained by the membrane. Various semipermeable membranes are now being used in commercial processes for performing separations by the reverse osmosis treatment of aqueous solutions either for a portion of relatively pure water or for concentration of a liquid solution being treated, or both. An example of the semipermeable membranes which are used will include the early Loeb-type membranes which are fashioned from cellulose diacetate by the process such as described in U.S. Pat. Nos. 3,133,132 and 3,133,137. These Loeb-type membranes comprise an asymmetric type which are characterized by a very thin, dense surface layer or skin which is supported upon an integrally attached, much thicker supporting layer. In addition to this type of semipermeable membrane, other types of membranes which are in use will include those which have been fabricated from polyamides, polyimide, polyphenyl esters, polysulfonamides, polybenzimidazole, polyarylene oxides, polyvinylmethyl ether and other polymeric organic materials.

In addition to the reverse osmosis system which is employed for the separation of liquids, it is also possible to separate various gases which are present in a gaseous feed mixture.

It is taught in U.S. Pat. No. 4,243,701 to Riley et al that certain membranes may also be utilized for the separation of various gases. The separation of a gas mixture utilizing a membrane is effected by passing a feed stream of the gas across the surface of the membrane. Inasmuch as the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while, conversely, the residue stream is enriched in the less permeable component of the feed.

Another type of separation process in which various components of fluid mixtures are separated involves the use of adsorbents such as molecular sieves. In the adsorption type of process, the adsorption exhibits a selectivity for one component of the mixture over another or, with a molecular sieve, one component is retained more than other components. The adsorbent may be employed in the form of a dense compact fixed bed which is alternatively contacted with the feed mixture and desorbent materials. In one embodiment, the adsorbent is employed in the form of a single static bed in which case the process is only semicontinuous. In another embodiment, a feed of two or more static beds may be employed in a fixed bed contact with appropriate valving employed in the flow scheme so that the feed mixture is passed through one or more adsorbent beds while the desorbent material is passed through one or more of the other beds in the operation. The flow of said mixture and desorbent material may be effected in either an upward or downward flow through the adsorbent. The most commercially successful embodiment of the adsorptive type separation process comprises the countercurrent moving bed or simulated moving bed countercurrent flow scheme. In such a type of system the adsorption and desorption operations are continuously taking place which allows both continuous production of an extract and raffinate stream along with the continual use feed and desorbent streams.

Various types of materials which may be employed as separation membranes have been shown in prior U.S. patents. For example, the incorporation of two components in a membrane system has been shown in U.S. Pat. Nos. 3,457,180, 3,878,104, 3,993,566, 4,032,454 and 4,341,605 which teach the use of structural supports or reinforcement fibers or fabrics to aid the membrane in resisting the high pressures which are utilized in a reverse osmosis process. U.S. Pat. No. 3,556,305 discloses a "sandwich" type reverse osmosis membrane comprising a porous substrate covered by a barrier layer which, in turn, is covered by a polymer or film bonded to the barrier layer by an adhesive polymeric layer. U.S. Pat. No. 3,862,030 discloses a polymeric matrix having an inorganic film such as silica dispersed throughout the matrix to impart a network of microvoids or pores of a size of about 0.01 to about 100 microns, which are capable of filtering microscopic or ultrafine particles of submicron size. U.S. Pat. No. 4,302,334 discloses a membrane "alloy" comprising a hydrophobic fluorocarbon polymer blended with a polyvinyl alcohol polymer which imparts hydrophilic properties to the membrane.

U.S. Pat. No. 4,230,463 discloses a multicomponent membrane which may be useful for the separation of gases comprising a polymer coating on a porous separation membrane, the latter may also comprise a polymer such as polysulfone. However, the polysulfone support which is used to prepare this membrane is not unduly porous in nature and possesses a large ratio of total surface area to total pore cross-sectional area. The patent particularly discloses the use of membranes having minimum ratios of total surface area to total pore cross-sectional area of about 1000:1. In addition, the patent discusses the separation of nonpolar gases as a primary function of the membrane, not the coating.

Other types of membranes which may be employed to effect the separation of gases may comprise the mixed matrix type of membrane such as molecular sieves incorporated with polymeric membranes. One particular type of mixed matrix membrane comprises a type 5A (Linde) zeolite incorporated with a silicon rubber matrix. This type of membrane was disclosed in an article "*The Diffusion Time Lag in Polymer Membranes Containing Adsorptive Fillers*" in J. Polymer Sci.; Symposium #41, 79–93 (1973). This article teaches that the zeolite "filler" causes a time lag in reaching steady state permeation of the membrane by various gases due to the adsorption of the gases by the zeolite. It is taught in this article that once the zeolite becomes saturated by the permeate gas, a steady state rate of permeation through the membrane is reached so that the membrane selectivity is essentially the same as if the zeolite was not present.

As will hereinafter be shown in greater detail, we have now discovered that a multicomponent membrane may be utilized to effect a separation of polar gases from nonpolar gases in a process which results in the obtention of a high flux in combination with a high separation factor.

BRIEF SUMMARY OF THE INVENTION

This invention relates to a process for the separation of polar gases. More specifically, the invention is concerned with a process for the separation of polar gas from nonpolar gases utilizing a multicomponent membrane. The particular multicomponent membrane which is employed to effect the separation will possess the desirable characteristics which include a high flux rate and a high separation factor.

The separation of polar gases from nonpolar gases may constitute an important aspect which is attendant in commercial plant operations. For example, flue gases emanating from the combustion of various fuels will contain a mixture of gases such as carbon dioxide, nitrogen, oxygen and sulfur dioxide. The presence of sulfur dioxide may be detrimental to the environment and therefore it is incumbent upon the operator of the plant to separate this gas from other nonnoxious gases. Likewise, in refinery operations, certain processes result in the production of gases during the refining operation. In many instances, due to the particular source of the hydrocarbonaceous mixture which is undergoing processing, it will contain hydrogen sulfide. It is therefore necessary to separate and remove this gas from other refinery gases such as hydrocarbon gases including methyl, propyl, ethyl, etc., and thus render the hydrocarbon gases suitable for further use in petrochemical processes.

It is therefore an object of this invention to provide a process for the separation of polar gases from nonpolar gases.

A further object of this invention is to provide a separation process utilizing, as separation means therefor, a multicomponent membrane which possesses the capability of effecting a viable separation process whereby polar gases are removed from nonpolar gases.

In one aspect an embodiment of this invention is found in a process for the separation of a polar gas from a nonpolar gas in a feed mixture containing said gases which comprises contacting said mixture with the upstream face of a multicomponent membrane which comprises a mixture of a glycol plasticizer having a molecular weight of from about 200 to about 600 and an organic polymer cast on a porous support, said support having a ratio of total surface area to total pore cross-sectional area of from about 5:1 to about 900:1, at separation conditions, which said polar gas has a greater steady state permeability than said nonpolar gas, and recovering the permeate which emanates from the downstream face of said membrane, said permeate comprising a product mixture in which the proportion of polar gas to nonpolar gas is greater than the proportion of polar gas to nonpolar gas in said feed mixture.

A specific embodiment of this invention is found in a process for the separation of a polar gas such as hydrogen sulfide from a mixture of nonpolar hydrocarbon gases in a feed mixture containing such gases which comprises contacting said mixture with the upstream face of a membrane which comprises a mixture of polyethylene glycol and silicon rubber cast on a polysulfone support, said polysulfone support having a ratio of total surface area to total pore cross-sectional area of from about 5:1 to about 900:1 at ambient temperatures and a pressure in the range of from about 10 to about 500 pounds per square inch gauge, and recovering the permeate which emanates from the downstream face of said membrane, said permeate containing a greater proportion of hydrogen sulfide to hydrocarbon gases than was present in the feed mixture.

Other objects and embodiments will be found in the following detailed description of the present invention.

DETAILED DESCRIPTION OF THE INVENTION

As hereinbefore set forth, the present invention is concerned with a process for the separation of polar gases from a mixture of polar and nonpolar gases. The separation of polar gases from mixtures thereof constitutes a desirable commercial process, such separations including sulfur dioxide from flue gases, hydrogen sulfide from refinery off-gases and ammonia from mixtures of ammonia, nitrogen and hydrogen. The separation of the polar gases from the nonpolar gases is effected by passing the feed mixture of polar gases and nonpolar gases over the upstream face of a multicomponent membrane. In the preferred embodiment of the present invention, the multicomponent membranes will comprise a mixture of a glycol plasticizer which possesses a molecular weight of from about 200 to about 600 and an organic polymer, said mixture having been cast upon a porous support of a particular type hereinafter set forth in greater detail. The multicomponent membrane incorporates a plasticizer and an organic polymer cast upon a porous organic polymer support. The plasticizer which is employed comprises a liquid having a high boiling point and a low partial pressure which is dispersed uniformly as an emulsion in the organic polymer, or in homogeneous phase with a solution of the polymer. A particularly effective plasticizer which may be used for the separation of gases comprises a glycol having a molecular weight of from about 200 to about 600 incorporated in an amount preferably from about 5% to about 50% by weight with a polymer such as silicon rubber.

The porous support upon which the aforesaid mixture is cast comprises a polymer such as cellulose acetate or polysulfone, said support having a ratio of total surface area to total pore cross-sectional area of from about 5:1 to about 900:1. The efficacy of the membrane which is used in the present invention to separate the polar gas from the nonpolar gas is due to the presence of the plasticizer such as the glycol, examples of glycols which may be employed including tetraethylene glycol, propylene glycol, polyethylene glycol, etc. as one component of the multicomponent membrane. The controlling mechanism which is involved in the separation process of the present invention comprises the solubility of the polar gases in the glycol plasticizer. Inasmuch as the glycol plasticizer is a good solvent for the polar gases, but is not a good solvent for the nonpolar gases, the former will pass through the membrane at a much more rapid rate due to the solubility of the gases in the glycol, thereby promoting the separation process and imparting a good selectivity rate and flux to the membrane.

The separation of the polar gases from nonpolar gases may be effected over a wide range of separation conditions. In the preferred embodiment of the invention, the process is effected at ambient temperatures and at a moderate pressure which may range from about 10 to about 500 pounds per square inch gauge (psig) on the upstream face of the multicomponent membrane.

The separation of the polar gases from nonpolar gases in the process of the present invention results from the fact that the different components, that is, the polar and nonpolar gases which are present in a feed mixture, will pass through a properly selected membrane at different rates due to different diffusivity and solubility characteristics which may be collectively referred to as permeability of each component in the feed mixture. This phenomenon may be expressed in terms of separation factors as defined in the formula:

$$\alpha \, A/B = \frac{\text{Flux of } A}{\text{Flux of } B}$$

where both fluxes are measured at the same pressure differential.

$\alpha A/B$ — separation factor

The higher the separation factor, the more efficient separation will be achieved.

As was hereinbefore set forth, due to the unexpected solubility of the polar gases in the glycol plasticizer component of the membrane, a surprising and unexpected increase will occur with regard to the separation factor of the membrane for the feed mixture containing the polar gases and nonpolar gases. In this instance, the polar gases will possess a greater steady state permeability than is possessed by the nonpolar gases, this factor contributing to the greater separation factor and flux which is obtained when utilizing the multicomponent membrane described herewith.

The multicomponent membrane which is used in the process of this invention may be prepared by any means known in the art. One method for preparing the desired membrane involves the formation of an emulsion or solution of a plasticizer of the type hereinbefore set forth in greater detail with an organic polymer dissolved in a suitable solvent followed by casting of the emulsion or solution onto a porous polymeric support which possesses the desired ratio total surface area to total pore cross-sectional area to obtain the desired multicomponent membrane. A suitable solvent which may be employed, particularly when the organic polymer which is used in the mixture with the plasticizer is silicon rubber, comprises a Freon which is liquid at standard temperature and pressure, a particular example being trifluorotrichloroethane. In the preferred embodiment of this invention, the concentration of the organic polymer in the solvent will be in a range of from about 0.5% to about 50% by weight in order to obtain a membrane which possesses a maximum flux capability. The emulsion or solution of the plasticizer and organic polymer is preferably degassed prior to casting on the porous polymer support by exposure to at least a partial vacuum whereby the formation of pin holes or voids within the membrane is minimized. The casting of the mixture on the porous support is effected by pouring or spreading the emulsion or solution of plasticizer and organic polymer onto the porous polymer support and thereafter curing the membrane by exposing it to an elevated temperature which may range up to about 100° C. for a period of time which is sufficient to evaporate substantially all of the solvent. As an alternative, but still viable method of forming the membrane, the plasticizer may be poured or coated onto the porous support in a first step followed by casting the organic polymer onto the coated support. Following this, the curing of the multicomponent membrane is then effected in a manner which was previously discussed.

The following examples are given for purposes of illustrating the process of this invention. However, it is to be understood that the examples are presented merely for illustrative purposes and are not intended to unduly limit the broad scope of the present invention in strict accordance therein.

EXAMPLE I

The multicomponent membranes which were used in the present invention were prepared by dissolving silicon rubber in an amount of from about 5% to 7% by weight and polyethylene glycol having a molecular weight of about 400 in an amount of 20% by weight with respect to the silicon rubber in trifluorotrichloroethane. The emulsion was effected by vigorous shaking for a period of 1 to 3 minutes. Following this, the casting solution was degassed by means of exposure to vacuum and the emulsion was coated on a highly porous polysulfone under a vacuum of from 5" to 20" of Hg. The cast membranes were then cured at a temperature of 82° C. for a period ranging from 30 to 60 minutes. Three different batches of porous polysulfone were used.

EXAMPLE II

The multicomponent membranes which were prepared according to Example I above which were labeled "$A_1$", "$A_2$" and "$A_3$" were then tested by utilizing a sample having a diameter of 7.5 cm placed in a test apparatus. The gas to be tested was then passed through the membrane under a pressure of 50 psig at atmospheric temperature. The fluxes were measured for each gas, both polar and nonpolar in nature.

As a comparison, another membrane was also prepared and measured in a like manner. The membrane which was compared to the membranes of the present invention comprises silicon rubber coated on the same polysulfone, said membrane being identified as membrane "B". This coating procedure is identical to that set forth in U.S. Pat. No. 4,230,463 except for using a polysulfone with a higher porosity than specified. Another membrane comprised polysulfone coated with polyethylene glycol; while such "immobilized liquid membranes" (as described in *Recent Developments in Separation Science*, Ward, W.J. III, Vol I CRC Press, Ohio, 1972, N.N.Li, Ed.) can have high selectivities, stability is a problem and no long-term steady data could be obtained. In the first test, the separation of a polar gas comprising sulfur dioxide was measured with relation to nonpolar gases, carbon dioxide and nitrogen. The results of the selectivities (defined as a ratio of the pure gas fluxes) for these gases are set forth in Table 1 below:

TABLE 1

| MEMBRANE | $A_1$ | B |
|---|---|---|
| Selectivity | | |
| $\alpha(SO_2/CO_2)$ | 49.2 | 7.49 |
| $\alpha(SO_2/N_2)$ | 2733 | 85.1 |
| Flux | | |
| $(\overline{P}/\alpha)SO_2$ | $3.32 \times 10^{-4}$(i) | $4.5 \times 10^{-4}$(i) |

(i) $cm^3(STP)/cm^2$-sec-cm(Hg)

It is apparent from a comparison of the results obtained in the above Table that the multicomponent membrane of the present invention leads to very high selectivities and flux for $SO_2$; furthermore, the membrane is remarkably stable. The membrane which was formed by treating polysulfone with silicon rubber possessed a flux rate similar in nature to the flux rate of the multicomponent membranes of the present invention; however, the selectivities were considerably and distinctively lower. The membrane formed by coating polysulfone with polyethylene glycol alone could not withstand pressure differentials of 10–50 psi.

EXAMPLE III

A test similar in nature to that set forth in Example II above was performed for the separation of a polar gas ammonia from nonpolar gases such as hydrogen and nitrogen. The results of these tests using the membranes described in Example II are set forth in Table 2 below. Some data from literature are also included for comparison.

TABLE 2

| MEMBRANE | $A_1$ | $A_2$ | $A_3$ | B | C(iii) | D(iv) | E(v) |
|---|---|---|---|---|---|---|---|
| Selectivity | | | | | | | |
| $\alpha(NH_3/H_2)$ | 78.8 | 80.7 | 78.6 | 11.6 | 39.2 | 3.81 | 4.09 |
| $\alpha(NH_3/N_2)$ | 1423 | 1350 | 1100 | 34.8 | 401 | 149 | 295 |
| Flux | | | | | | | |
| $NH_3$ | $3.76 \times 10^{-4}$ (i) | $1.64 \times 10^{-4}$ (i) | $2.24 \times 10^{-4}$ (i) | $1.9 \times 10^{-4}$ (i) | $6.7 \times 10^{-8}$ (ii) | $2.10 \times 10^{-4}$ (i) | $5.3 \times 10^{-9}$ (ii) |

(i) $(\overline{P}/\alpha)NH_3 = cm^3(STP)/cm^2$-sec-cm(Hg)
(ii) $(\overline{P})NH_3 = cm^3(STP)/cm^2$-sec-cm(Hg)
(iii) From Ward, W.J. III, "Recent Developments in Separation Science," Vol. 1 N.N. Li, Ed., CRC Press, Ohio, 1972, Immobilized Liquid Membrane.
(iv) From U.S. Pat. No. 4,230,463, Polysulfone coated with silicone rubber.
(v) From U.S. Pat. No. 4,230,463, Polysulfone film.

A comparison of the results with those reported in the literature shows that the multicomponent membrane which was described in the present specification exhibits both a high selectivity with regard to the separation of the ammonia polar gas from the nonpolar hydrogen and nitrogen gases as well as a high flux rate in comparison to the conventional membranes.

EXAMPLE IV

In this example, the separation of the polar gas hydrogen sulfide from the nonpolar gases comprising methane, carbon dioxide and hydrogen was tested. The results of these tests are set forth in Table 3 below:

TABLE 3

| MEMBRANE | $A_1$ | $A_2$ | $A_3$ | B | C(iii) | D(iv) | E(v) |
|---|---|---|---|---|---|---|---|
| Selectivity | | | | | | | |
| $\alpha(H_2S/CH_4)$ | 121 | 115 | 185 | 9.91 | 51.5 | 13.6 | 12.5 |
| $\alpha(H_2S/CO_2)$ | 5.94 | 5.41 | 5.74 | 2.31 | 2.37 | 0.82 | 0.45 |
| $\alpha(H_2S/H_2)$ | 19.4 | 18.0 | 27.3 | 8.75 | 12.9 | 0.56 | 0.24 |
| Flux | | | | | | | |
| $H_2S$ | $9.2 \times 10^{-5}$ (i) | $3.7 \times 10^{-5}$ (i) | $7.8 \times 10^{-5}$ (i) | $1.4 \times 10^{-4}$ (i) | $2.2 \times 10^{-8}$ (ii) | $3.1 \times 10^{-5}$ (i) | $0.31 \times 10^{-9}$ (ii) |

(i) $(\overline{P}/\alpha)H_2S = cm^3(STP)cm/cm^2$-sec-cm(Hg).
(ii) $(\overline{P})H_2S = cm^3(STP)/cm^2$-sec-cm(Hg).
(iii) From Ward, W.J. III, "Recent Developments in Separation Science," Vol. 1, N.N. Li, Ed., CRC Press, Ohio, 1972, Immobilized Liquid Membrane.
(iv) From U.S. Pat. No. 4,230,463. Polysulfone coated with silicone rubber
(v) From U.S. Pat. No. 4,230,463. Polysulfone film.

The above test again clearly demonstrates the superiority of the multicomponent membrane described in the present specification to effect an efficient separation of the polar gas hydrogen sulfide from nonpolar gases as exemplified by methane, carbon dioxide and hydrogen, said selectivity being accompanied by a relatively high flux rate. The remaining membranes which were tested possessed some desirable characteristics, for example, a high flux rate but a low selectivity or visa versa, a good selectivity but a low flux rate. Therefore, the above tests clearly show the distinct advantages which may be enjoyed when employing the multicomponent membranes of the present invention rather than other conventional types of membranes.

We claim as our invention:

1. A process for the separation of a polar gas from a nonpolar gas in a feed mixture containing said gases which comprises contacting said mixture with the upstream face of a multicomponent membrane which comprises a mixture of a glycol plasticizer having a molecular weight of from about 200 to about 600 and an organic polymer cast on a porous support, said support having a ratio of total surface area to total pore cross-sectional area of from about 5:1 to about 900:1, at separation conditions, which said polar gas has a greater steady state permeability than said nonpolar gas, and recovering the permeate which emanates from the downstream face of said membrane, said permeate comprising a product mixture in which the proportion of polar gas to nonpolar gas is greater than the proportion of polar gas to nonpolar gas in said feed mixture.

2. The process as set forth in claim 1 in which said separation conditions include ambient temperatures and a pressure in the range of from about 10 to about 500 pounds per square inch gauge.

3. The process as set forth in claim 1 in which said glycol plasticizer having a high boiling point and a low partial pressure is uniformly dispersed as an emulsion in said organic polymer or is in homogeneous phase as a solution with said organic polymer.

4. The process as set forth in claim 1 in which said organic polymer comprises a silicon rubber.

5. The process as set forth in claim 1 in which said porous support comprises cellulose acetate.

6. The process as set forth in claim 1 in which said porous support comprises polysulfone.

7. The process as set forth in claim 1 in which said polar gas is selected from the group consisting of ammonia, hydrogen sulfide and sulfur dioxide.

8. The process as set forth in claim 1 in which said polar gas is ammonia, and said nonpolar gas comprises a mixture of nitrogen and hydrogen.

9. The process as set forth in claim 1 in which said polar gas is hydrogen sulfide and said nonpolar gas comprises a mixture of hydrocarbon gases.

10. The process as set forth in claim 1 in which said polar gas is sulfur dioxide and said nonpolar gas comprises a mixture of carbon dioxide, nitrogen and oxygen.

* * * * *